July 24, 1934.                F. X. A. EBLE ET AL                1,967,230
                            FINANCIAL STATUS VISUALIZER
                                Filed July 14, 1932
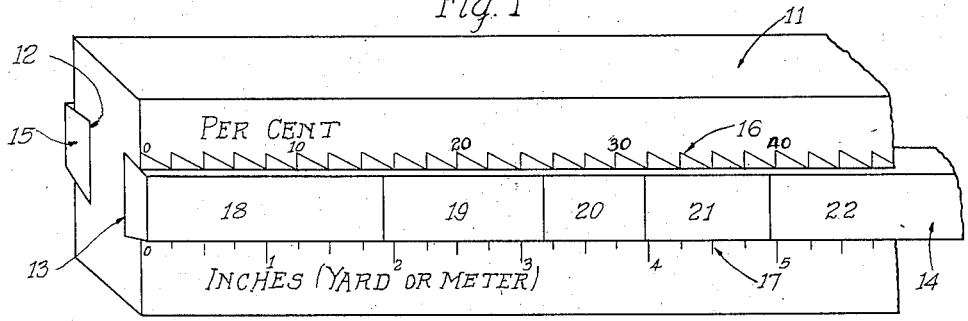
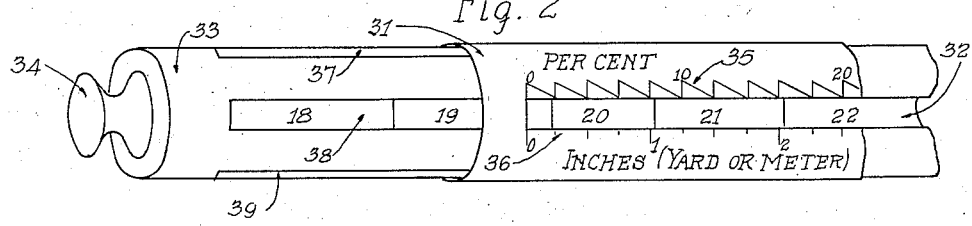
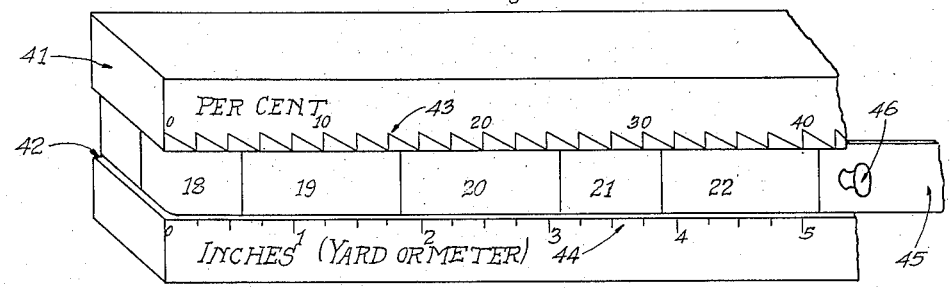
Inventors.
Francis X. A. Eble and
Fred W. Gast
By J. F. Mothershead
                    Attorney Patented July 24, 1934

1,967,230

UNITED STATES PATENT OFFICE 1,967,230

FINANCIAL STATUS VISUALIZER

Francis X. A. Eble, Salt Lake City, Utah, and Fred W. Gast, St. Louis, Mo.

Application July 14, 1932, Serial No. 622,558

2 Claims. (Cl. 116—135)

(Granted under the act of March 3, 1883, as amended April 30, 1928; 370 O. G. 757)

The invention described herein may be manufactured and used by or for the Government of the United States for governmental purposes only without the payment of any royalty thereon.

Our invention relates to a device by means of which a financial status may be visualized.

We use for this purpose two relatively movable members which for convenience may be a sliding or revoluble connection with each other. In our preferred form these members are straight and have a sliding connection.

Referring to the accompanying drawing:

Figure 1 is a perspective view of a preferred form of our device.

Figure 2 is a perspective view of another form of our invention in which concentric cylinders are used.

Figure 3 is a perspective view of a third modification of our invention.

Referring to Figure 1 of the drawing, 11 represents a bar of wood or the like which for convenience may be made a yard long, on opposite faces of which are grooves 12 and 13, in which are mounted sliding sticks 14 and 15. These sliding sticks 14 and 15 extend above the adjacent surfaces of the bar 11 as shown in this drawing.

On the bar 11, adjacent to the grooves is printed, or otherwise marked, a percentage scale 16 using the length of this bar to represent 100 per cent, and also a scale 17 graduated in convenient subdivisions, for example, in feet, tens and hundredths of feet, or in feet, inches and tenths of inches. If, however, a different unit were used, as for example the metre, then the subdivisions would correspond to this unit, as centimeters and millimeters.

The sliding stick 14, being assumed to represent a total of a plurality of items, there are marked off on the face of this slide parallel bands 18, 19, 20, 21 and 22, representing to scale the proportion which each of the several items bears to the total. We mark each band with an identifying title and preferably add the amount of each item in figures. By applying contrasting colors to adjacent bands, the relative proportions of each of these subdivisions are easily visualized while a more accurate determination of proportion may be made by moving one margin of a band to the zero point of the percentage scale and reading the scale at the opposite margin of the band.

On the companion slide 15 may be laid off to the same scale as that used on the slide 14, the estimated receipts for the same period, thus if the total of the estimated receipts exceeds the total of the estimated expenditures, the slide 15 will be correspondingly longer than the bar 11, this excess representing a surplus, while if this total should be less than the estimated expenditures, a deficit would be visually indicated by a corresponding band.

In the modification illustrated in Figure 2, there is a hollow cylinder 31 provided with a longitudinal slot 32, an inner cylinder 33 concentric with and adapted to slide within the tube 31 which is provided with suitable handles 34. In this form, the length of the slot 32 is the unit of length which is used and it is provided with the scales 35 and 36 which correspond to the scales 16 and 17 of Figure 1. In this form, the assets and liabilities may be laid off to scale on the cylinder 33 as indicated by the longitudinal stripes 37, 38 and 39.

In the modification illustrated in Figure 3, there is a bar 41 provided with an external groove 42, scales 43 and 44, the latter corresponding to 16 and 17 of Figure 1, a flexible tape 45, and a handle 46 for readily moving the tape 45, on which bands may be marked representing to scale the items of estimated expenditures and receipts.

Our invention has been found particularly useful in illustrating the status of the budget and in solving the problems involved in keeping the authorized expenditures of the United States Government within the probable income for the coming fiscal year. Obviously, if the total probable income can not be increased, the estimated receipts would be used as the standard for comparison and the estimated expenditures would be laid off according to that standard.

In this application of our invention a tabulation of the estimated expenditures of the United States Government for the fiscal year 1932 was made. These items were then grouped under the headings:

"Interest on the Public Debt"_____ $605,000,000
"Debt Retirement"_____ 411,946,300
"Trust Funds and Tax Refunds"____ 256,784,600
"Veterans of Former Wars"_____ 989,500,000
"National Defence"_____ 721,438,400
"Public Works"_____ 528,231,300
"Special Aids"_____ 536,896,950
"Miscellaneous" _____ 432,355,850

The total of these items was $4,482,153,400 which total was then treated as visually represented by the linear unit of measure adopted for convenience, namely the yard, and by calculation it was found that according to this scale one inch would represent approximately $124,504,261.11 and relative lengths for each of the subtotals were calculated and laid off to scale on the face of one of our slides 14, each band bearing a title corresponding to the subtotal represented with the amount in figures. The painting of these bands in contrasting colors as previously described serves to accentuate the relative proportions of these subtotals. Using the yard as representing 100 per cent, a scale of percentages was then marked on the companion member 11 of our device adjacent to the slide 14. This scale may extend the full length of 11 but this is not always necessary. In order to obtain the percentage that any one, or a plurality of adjacent, items is of the total, the slide should be moved to bring one margin of the corresponding band or group of bands opposite to the zero of the scale 16 and then read the percentage directly at the opposite margin of this band or group of bands. Obviously if a percentage desired is a total of items which are not adjacent on the slide then the separate percentages must be obtained and added by the user.

On a companion slide 15, the amounts of the estimated receipts for the fiscal year are laid off to the same scale as that used for the estimated expenditures. If these receipts should exceed the estimated expenditures, the slide 15 would be more than a yard long, the excess representing a probable surplus. If however this total should fall short of the total of estimated expenditures this deficit would be represented by a corresponding band.

In the example above quoted the estimated receipts were:

| | |
|---|---|
| Income Tax | $1,076,000,000 |
| Internal Revenue | 526,000,000 |
| Customs | 375,000,000 |
| Miscellaneous | 265,000,000 |

The total of these items was found to be $2,242,000,000 which exceeded the total of the estimated expenditures by $2,240,153,400 which was graphically shown on the sliding stick 15 by a corresponding band marked "Deficit".

The scale 17 aids in impressing upon those unfamiliar with our device the relative proportions of the various items. Obviously when the financial status to be visualized changes, either the colored surface of the sliding sticks 14 and 15 may be removed by means of a paint remover, sandpapering or in any other suitable substitution mode or these sticks may be replaced by others bearing data and colored bands corresponding to the revised financial status.

Various modifications of our invention may obviously be made. We therefore claim our invention without other limitations than those which may be incorporated in our claims as finally allowed.

What we claim is:

1. In an instrument, the combination of a stationary member, a scale thereon dividing the member into equal units of length, the total of which represents a total of a plurality of known amounts, a sliding member, a scale upon the sliding member extending the full width of said sliding member calibrated in lengths proportionate to the individual units of the plurality of known amounts and cooperating with the scale on the stationary member, a second scale on said stationary member and cooperating with the extensions of the calibrations of the scale on said sliding member, said second scale being calibrated in percentage ratios of the calibration of the scale on the sliding member to the total length of the first mentioned scale on said stationary member.

2. In an instrument, the combination of a stationary member, a scale thereon dividing the member into equal units of length the total of which represents a total of a plurality of fixed amounts, a sliding member, a scale upon the sliding member calibrated in lengths proportionate to the individual units of the plurality of fixed amounts, a second scale on said stationary member and cooperating with the scale on said sliding member, said second scale calibrated in percentage ratios of the calibration of the scale on the sliding member to the total length of the scale on said stationary member.

FRANCIS X. A. EBLE.
FRED W. GAST.